United States Patent [19]

Emery

[11] 4,437,083
[45] Mar. 13, 1984

[54] CURRENT TRANSFORMER FOR TURBINE GENERATORS

[75] Inventor: Franklin T. Emery, Greentree Borough, Pa.

[73] Assignee: Electric Power Research Institute, Inc., Palo Alto, Calif.

[21] Appl. No.: 340,666

[22] Filed: Jan. 19, 1982

[51] Int. Cl.³ ............................................. H01F 15/02
[52] U.S. Cl. ...................................... 336/65; 336/90; 336/92; 336/174; 336/175
[58] Field of Search ................... 336/65, 90, 92, 174, 336/175

[56] References Cited

U.S. PATENT DOCUMENTS 2,431,189 11/1947 Moreton et al. ............... 336/174 X
4,156,846 5/1979 Harrold et al. ................ 361/31 X

FOREIGN PATENT DOCUMENTS 568990 11/1957 Italy .................................. 336/174
481081 3/1938 United Kingdom .
487651 6/1938 United Kingdom .

Primary Examiner—A. C. Prescott
Assistant Examiner—Susan Steward
Attorney, Agent, or Firm—G. H. Telfer

[57] ABSTRACT

A mounting device is disclosed which provides mechanical support and electrical insulation for a current transformer used in monitoring radio frequency signals in the neutral lead of a dynamoelectric machine. By encapsulating the current transformer in a rigid insulative apparatus with a central conductor passing therethrough, the transformer can be placed proximate the neutral bus of the dynamoelectric machine to avoid attenuation of the radio frequency signals.

2 Claims, 4 Drawing Figures

CURRENT TRANSFORMER FOR TURBINE GENERATORS

BACKGROUND OF THE INVENTION

The present invention relates to the mounting of a current transformer for use with a dynamoelectric machine and, more particularly, the mounting of a radio frequency current transformer to the lead box of a turbine generator.

The operation of turbine generators can adversely be affected by various types of faults. One such type of fault is caused by electrical arcing between strands, or between adjacent ends of a broken strand, in the high voltage stator winding conductors of a generator. The stator windings of a large generator are made up of stranded conductors encapsulated within relatively heavy high-voltage insulation and suitably connected together. Arcing faults may occur due to the breaking of one or more strands of the conductors themselves or the connections between conductors, or to local insulation failures between adjacent strands. These types of faults can cause intermittent or repeated arcing between the strands, or the strand ends involved, and lead to increasing overheating and eventual break-down of the major ground insulation, with resulting serious electrical failure. It is therefore desirable to detect the occurrence of such a fault at an early stage before any serious damage has occurred, so that remedial action may be taken. One such way for providing early detection of arcing faults is described in U.S. Pat. No. 4,156,846 issued to Harrold on May 29, 1979. It describes a method for detecting the presence of arcing faults in turbine generators by detecting high frequency currents which flow in the neutral lead of the generator winding when such arcing exists. The presence of this type of arcing can thus be detected by observing the high frequency neutral currents and monitoring them for the presence of the characteristic frequency distribution resulting from the resonance characteristics of the current path. In application, the radio frequency currents are monitored by connecting a high frequency current transformer to the neutral grounding lead, usually at the point where the generator's neutral grounding lead connects to the neutral transformer.

The current transformer must be properly installed on the neutral lead because, otherwise, voltage potential hazards will exist. Under normal generator operating conditions, the generator neutral lead's voltage is very close to ground potential. However, due to third harmonic current flow in the neutral lead, a voltage potential of approximately 300 VAC exists across the high voltage side of the neutral transformer. Also, during a generator fault condition, the neutral voltage can approach the generator's operating voltage and transient voltages can exceed even this value. The exact magnitude of voltage potential on the generator's neutral lead depends on a number of factors. However, it is important that the installation of the current transformer does not in any way degrade the performance of the generator's ground protection system. Since the outer case of the high frequency current transformer is at ground potential through a connecting coaxial cable and radio frequency monitor, adequate insulation must be provided to prevent electrical shorting between the generator's neutral ground protection system and the current transformer.

A present method of connecting and insulating the radio frequency current transformer consists of hand taping the neutral lead with a required minimum number of half-lapped layers of silicone rubber tape based on the generator's operating voltage. The purpose of this insulation is to prevent electrical shorts from developing between the case of the current transformer and the neutral lead. Typically, more than the recommended minimum number of layers are applied in order to build the neutral lead's diameter to that of the current transformer's inside diameter. On some neutral leads, the required minimum number of layers cannot be applied because the neutral lead's diameter is only slightly smaller than the current transformer's inside diameter. Furthermore, in some cases, the neutral lead is actually larger than the inside diameter of the current transformer and insulation in these cases requires extensive modification to the neutral grounding circuit. Furthermore, care must be taken to ensure that the current transformer is tightly attached to the neutral lead because the neutral lead is subjected to a high level of vibration and, if relative movement exists between the neutral lead and the current transformer, the insulation between the neutral lead and the current transformer may be abraded, causing the possibility of electrical shorts therebetween.

SUMMARY OF THE INVENTION

The present invention provides a mounting apparatus which mechanically fixes the position of the current transformer and electrically insulates the current transformer's case from surrounding objects of different voltage potentials. The present invention is attachable to the lead box of a generator and eliminates the need for taping the neutral lead with the insulative tape described above. It further eliminates the abrasion problem caused by the vibration of the current transformer and makes the diametric size of the neutral grounding cable irrelevant to the use of a radio frequency current transformer. The minimum strike distance between the current transformer and the neutral lead or other conductive objects above ground potential is also made unimportant since the present invention provides complete insulative encapsulation of the current transformer.

Besides solving these electrical and mechanical problems of mounting the current transformer, the present invention enables the current transformer to be placed at a location, inside the generator's lead box, where increased sensitivity of arc detection can be obtained. Radio frequency attenuation measurements have shown that a stator winding exhibits 7 dB of attenuation in the radio frequency signal from the top of the phase to the neutral lead bus. Further measurements have shown that approximately 11 dB of attenuation occurs because of the generator's neutral grounding circuit. This attenuation, caused by the neutral grounding lead, is due to its shunt capacitance and this relocation of the current transformer closer to the generator results in better sensitivity of arc detection because the radio frequency signal is measured prior to the occurrence of the attenuation caused by the shunting capacitance of the neutral grounding lead.

The present invention is designed to fit inside the generator's lead box between the generator's neutral lead bus and the wall of the lead box. Its specific dimensions can be easily altered to suit virtually any large turbine generator and its main body is made from a suitable rigid insulative material which has a high mechanical strength and good insulative properties, such as glass epoxy.

BRIEF DESCRIPTION OF THE DRAWINGS

The present invention will be more fully understood from the following description of the preferred embodiment read in conjunction with the figures, in which.

DESCRIPTION OF THE PREFERRED EMBODIMENT

The present invention relates to the detection of high frequency currents in a conductor and, more particularly, to the mounting of a radio frequency current transformer around a neutral lead to detect radio frequencies which are indicative of electrical arcing within a dynamoelectric machine.

Figure 1:
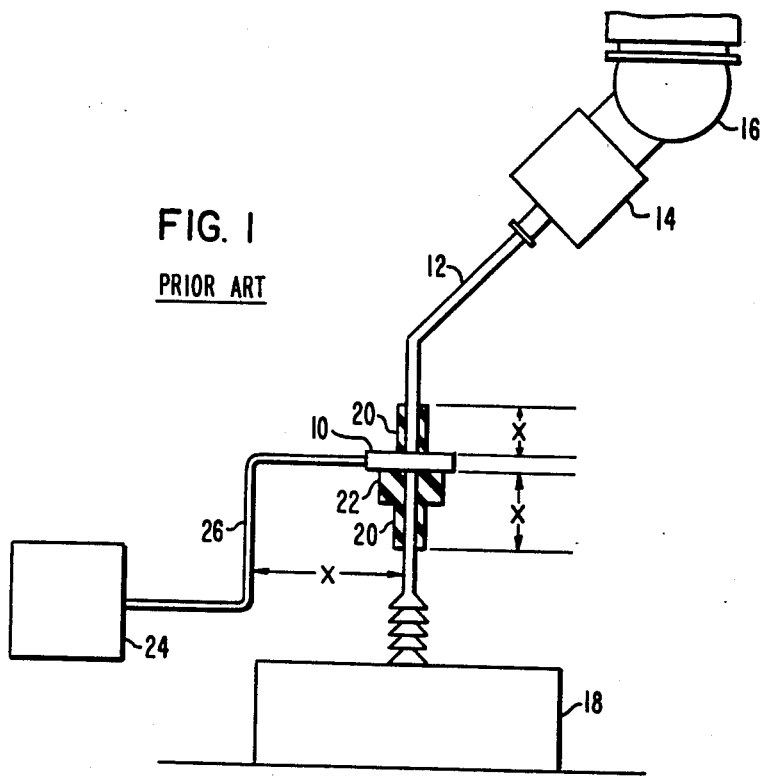
FIG. 1 exemplifies an application of a radio frequency current transformer to a neutral lead of an electrical generator as would be typically done presently.

FIG. 1 illustrates a typical present method of mounting a current transformer 10 around a neutral lead 22 of a turbine generator. Although particular applications may vary, the neutral lead 12 generally extends from a bushing structure 14 which is connected to a leadbox 16. The neutral lead 12 extends toward a neutral grounding device 18.

On power generation systems such as this, which utilize radio frequency monitors, the current transformer is usually disposed proximate the neutral grounding device 18. To insulate the current transformer 10 from the neutral lead 12, the lead 12 is wrapped with insulative tape 20 for a length sufficient to cover the neutral lead for the minimum required strike distance X on both sides of the case of the current transformer 10. This minimum striking distance X is a function of the possible voltage potential of the neutral lead 12 and is typically equal to 11 inches. The taped insulation 20 is built up around the neutral lead to a diameter sufficient to provide a good fit between it and the inside diameter of the current transformer 10. The insulation is further built up to form a support 22 for the current transformer 10. FIG. 1 illustrates a particular configuration and it should be understood that other configurations may differ in specific details but will be generally similar.

Also in FIG. 1, a radio frequency monitor 24 is shown connected to the current transformer 10 by a coaxial cable 26. Since the cable 26 is essentially at ground voltage potential, like the current transformer 10 itself, it must also maintain the minimum strike distance X as shown.

Although functionally workable, the setup illustrated in FIG. 1 can present several problems. The neutral lead must be hand taped to assure a proper insulation and mechanical fit between the tape (reference numerals 20 and 22) and the current transformer 10. Otherwise, system vibration can cause the current transformer 10 to abrade the tape 20 and result in an electrical short between the transformer 10 and the neutral lead 12. Furthermore, in some cases, the diameter of the neutral lead 12 is too large to permit the required amount of insulative taping and still fit within the inside diameter of the current transformer 10. This condition necessitates extensive modifications to the neutral grounding circuit.

Figure 2:
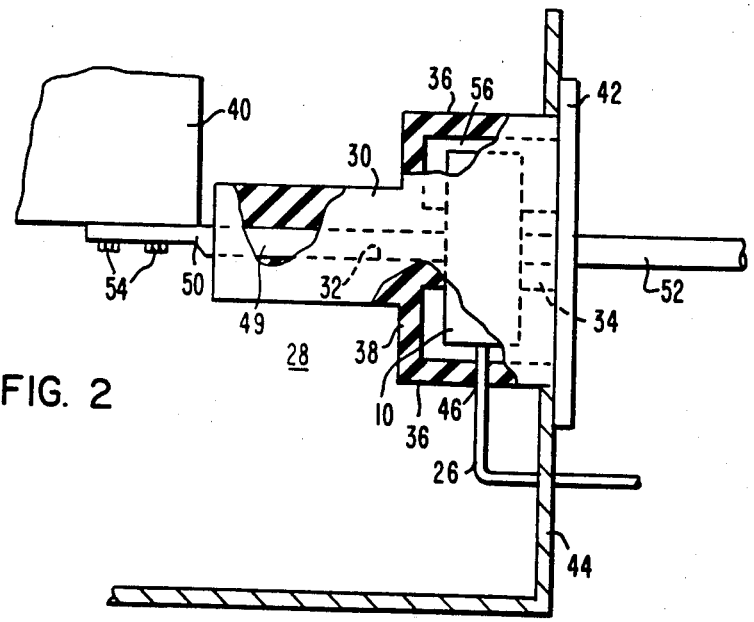
FIG. 2 illustrates the present invention applied between a neutral lead bus and a leadbox wall.

The present invention, as shown in FIG. 2, eliminates the above-described problems. The mounting apparatus 28 comprises a first rigid insulative member 30 which is generally cylindrical and has a central bore 32 therethrough. A portion 34 of this member is shaped to fit into the inside diameter of a current transformer 10. Another component part of the mounting apparatus 28 is a second rigid insulative member 36 which is generally cylindrical and shaped to fit around the outside diameter of a current transformer 10. Between these first 30 and second 36 members, a third rigid insulator 38 is disposed. The primary purpose of this third member 38 is to maintain the rigid association between the first and second members while providing electrical insulation between the transformer 10 and conductors of potentially higher voltage such as the neutral lead bus 40. It should be apparent from FIG. 2 and the discussion above that although this third rigid member 38 is shown as an annular flat plate shaped to fit between the first and second members, other suitable shapes are possible within the scope of the present invention.

A fourth rigid member 42 provides insulation at the remaining axial end of the mounting apparatus 28 and, in addition, provides a means for mounting the apparatus 28 to a leadbox wall 44 through which the apparatus 28 extends.

A means is provided for providing electrical communication between the current transformer 10 and an external conductor. In FIG. 2, this is shown as a radial hole 46 in the apparatus through which a coaxial cable 26 can pass.

It should be apparent from FIG. 2 and the discussion above that the present invention provides electrical insulation around the current transformer and supports the current transformer mechanically. As can also be seen, the present invention is shaped to fit through a hole in the wall 44 of a generator leadbox and is attachable thereto by any suitable means, such as, a plurality of bolts passing through the fourth rigid member 42 and the leadbox wall 44.

The bore 32 is shaped to receive a conductor 49 having an inboard end 50 and an outboard end 52. The inboard end 50 can be rigidly attached to the neutral bus 40 by any suitable means, such as bolts 54, and the outboard end 52 extends through the mounting apparatus 28 and the leadbox wall 44 toward eventual connection to a neutral grounding device (reference numeral 18 of FIG. 1). This conductor 49 can be a permanent part of the mounting apparatus 28 or assembleable during installation. However, it should be noted that the bore 32 and the annular cavity 56 are coaxially associated in such a way that a conductor 49 which passes through the bore 32 passes directly through the center of the annular cavity 56. Since the cavity 56 is shaped to receive and rigidly fix the position of a current transformer 10, a conductor 49 passing through the bore 32 will become the primary winding of the current transformer and the radio frequencies flowing through the conductor 49 can be monitored by the current transformer 10. The coaxial cable 26 is, of course, connected to a suitable radio frequency monitor (not shown in FIG. 2, but illustrated as reference numeral 24 in FIG. 1).

Figure 3:
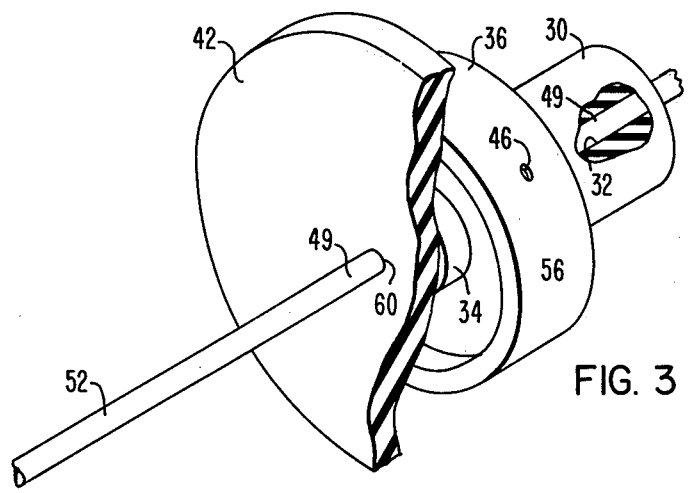
FIG. 3 shows a detailed illustration of the present invention.

FIG. 3 shows the mounting apparatus 28 in a partially sectioned perspective view. The rigid structure has an annular cavity 56 which is formed between the second rigid insulative member 36 and the portion 34 of the apparatus which is shaped to fit within the inside diameter of a current transformer (not shown in FIG. 3 but illustrated as reference numeral 10 in FIGS. 1 and 2). Therefore, the annular cavity 56 is shaped to receive and rigidly support a current transformer. In FIG. 3, it can also be seen that the fourth rigid insulative member 42 is provided with a hole 60 through which the conductor 49 can pass through. This hole 60, as should be apparent, must be aligned with the bore 32 in order for the conductor 49 to pass through the annular cavity and provide electrical communication between an electrical conductor connected to its inboard end 50 and one connected to its outboard end 52. In the discussion above, these were the neutral bus (reference numeral 40 in FIG. 2) and the neutral grounding device (reference numeral 18 in FIG. 1), respectively.

The components of the mounting apparatus 28 must be capable of providing mechanical support and electrical insulation around the current transformer. The precise shapes of the components are not as important as their association to form an insulative encapsulation of the current transformer while providing mechanical support for it. Another important requirement is the existence of a means for providing electrical communication between the current transformer within the annular cavity 56 and a conductor which is external to the mounting apparatus 28. The radial hole 46 in the second member 36 provides this means in FIG. 3, but it should be understood that the present invention is not so limited as to preclude other suitable means from its scope.

The fourth member 42 can be physically attached to the other components of the apparatus 28 in any suitable way such as the application of epoxy therebetween after installation of the current transformer within the annular cavity 56. The apparatus 28 can then be installed through a hole in the leadbox wall which is slightly larger than the outside diameter of the second member 36 but smaller than the outside diameter of the fourth member 42. Thus, the mounting apparatus 28 can be held in place either by fastening the fourth member 42 to the leadbox wall or, if the conductor 49 is rigidly attached to the bore 32, by exerting an inward force on the apparatus 28 toward the neutral bus (reference numeral 40 in FIG. 2) when connecting the inboard end 50 of the conductor 49 to the neutral bus 40.

It should be apparent to one skilled in the art that, regardless of the particular dimensional relationships and the component parts, the means of fastening them together and the specific method of attaching the mounting means 28 to the leadbox wall, the important features of the present invention are the electrically insulative encapsulation of the current transformer, the rigid mechanical support provided to the transformer and the geometric configuration which allows the conductor (reference numeral 49 in FIGS. 2 and 3) to pass through the inside diameter of the current transformer while being adequately insulated therefrom.

Figure 4:
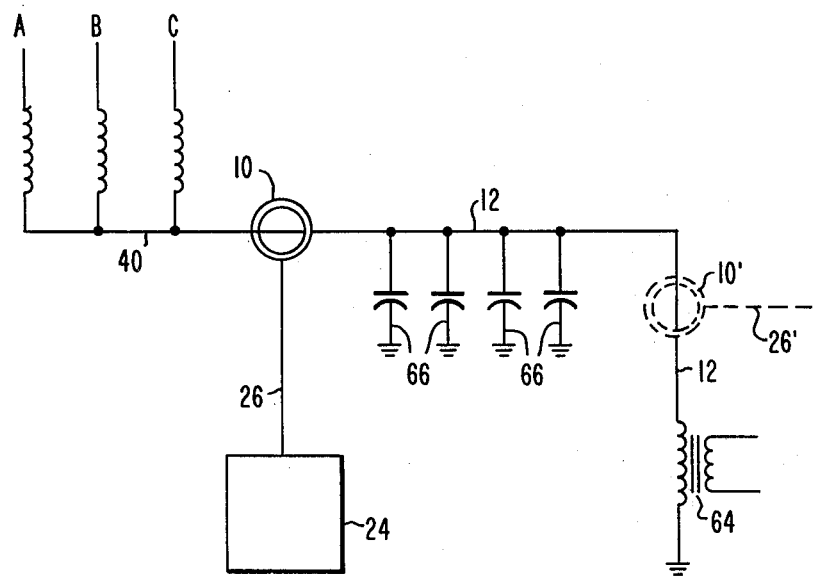
FIG. 4 is an electrical schematic which depicts a neutral lead grounding circuit and shows the location of the present invention and the former location of the radio frequency current transformer.

FIG. 4 schematically illustrates the sensitivity advantage of mounting the radio frequency current transformer proximate the neutral bus of an electrical generator. As described above, the present method of configuring a radio frequency monitoring system is to place the current transformer 10' around the neutral lead 12 proximate the neutral grounding transformer 64. This location places the current transformer 10', with its coaxial cable 26', beyond the neutral grounding leads distributed capacitance 66 and permits the radio frequency signals to be attenuated as they pass from the region of the deleterious electrical arcing (i.e. in phases A, B or C) toward the current transformer 10'.

The present invention, however, permits the current transformer 10 and its coaxial cable 26 to be placed proximate the neutral bus 40, between the potential region of arcing (i.e. phases A, B or C) and the attenuating distributed capacitance 66 of the neutral grounding lead 12. This location provides the radio frequency monitor 24 with signals of a higher sensitivity and permits early detection of electrical arcing within the phases of a dynamoelectric machine.

This relocation of the current transformer is made possible by electrical insulative and mechanical support characteristics of the present invention. The current transformer can thus be placed in close proximity to the neutral bus without the concern of maintaining the above-mentioned 11 inch strike distance or the required diametric thickness of insulative tape around the neutral lead which, in some cases, is difficult to achieve because of relative sizes of the neutral lead and the inside diameter of the current transformer.

It should be apparent that the present invention discloses a mounting apparatus that simplifies assembly of a radio frequency current transformer to a neutral lead of a dynamoelectric machine and makes possible the physical positioning of the current transformer proximate the machine's neutral bus to increase the sensitivity of radio frequency signals by minimizing the attenuation of these signals caused by the distributed capacitance of the neutral lead. It should further be apparent that, although the present invention has been described in considerable detail both in its shape and method of mounting, it should not be considered to be so limited. Further, it should be understood that other configurations and placements of the mounting apparatus are within the scope of the present invention.

What I claim is:

1. A current transformer mounting arrangement comprising:
   an annularly shaped current transformer having a conductor extending centrally therethrough and a cable extending from an outer portion thereof;
   an enclosure of generally rigid insulative material having said transformer disposed therein and comprising a first member having a bore through which said conductor extends, a first portion of said first member disposed through the inside diameter of said current transformer and a second portion of said first member extending axially from said first portion on a first, inboard, side of said current transformer, a second member disposed around the outside diameter of said current transformer, said second member and said first portion of said first member being generally coaxial, and a third member that joins said first and second members on said inboard side of said current transformer;
   said enclosure having an opening through which said cable extends;
   said enclosure second member being fit within an opening of a fixed wall of conductive material, and an enclosure fourth member located against the outside of said wall and joined to an outboard portion of said second member, said fourth member having an opening through which said conductor extends.

2. A current transformer mounting arrangement in accordance with claim 1 wherein:

said fixed wall is a wall of a lead box of a generator and within said lead box the inboard end of said conductor is joined to a neutral lead bus of said generator proximate the inboard end of said first enclosure member;

the outboard end of said conductor extends to a neutral grounding device; and, said cable is joined to a radio frequency arc monitor.

* * * * *